US011745426B2

(12) United States Patent
Mamrak et al.

(10) Patent No.: US 11,745,426 B2
(45) Date of Patent: Sep. 5, 2023

(54) SCAN FIELD VARIATION FOR ADDITIVE MANUFACTURING

(71) Applicant: General Electric Company, Schenectady, NY (US)

(72) Inventors: Justin Mamrak, Loveland, OH (US); MacKenzie Ryan Redding, Mason, OH (US); Thomas Graham Spears, Springdale, OH (US)

(73) Assignee: General Electric Company, Schenectady, NY (US)

( * ) Notice: Subject to any disclaimer, the term of this patent is extended or adjusted under 35 U.S.C. 154(b) by 545 days.

(21) Appl. No.: 16/761,644

(22) PCT Filed: Nov. 2, 2018

(86) PCT No.: PCT/US2018/058874
§ 371 (c)(1),
(2) Date: May 5, 2020

(87) PCT Pub. No.: WO2019/094280
PCT Pub. Date: May 16, 2019

(65) Prior Publication Data
US 2021/0178480 A1    Jun. 17, 2021

Related U.S. Application Data

(60) Provisional application No. 62/584,482, filed on Nov. 10, 2017.

(51) Int. Cl.
*B29C 64/268*    (2017.01)
*B22F 10/14*    (2021.01)
(Continued)

(52) U.S. Cl.
CPC ............ *B29C 64/268* (2017.08); *B22F 10/14* (2021.01); *B22F 10/28* (2021.01); *B22F 10/366* (2021.01);
(Continued)

(58) Field of Classification Search
CPC ........ B22F 10/366; B22F 10/14; B22F 10/20; B22F 12/41; B22F 12/37; B22F 12/67;
(Continued)

(56) References Cited

U.S. PATENT DOCUMENTS 5,352,405 A    10/1994 Beaman et al.
10,112,260 B2    10/2018 Crear et al.
(Continued)

FOREIGN PATENT DOCUMENTS

CN    107312711 A    11/2017

OTHER PUBLICATIONS

PCT International Search Report Corresponding to PCT/US2018/058874 dated Feb. 14, 2019.

*Primary Examiner* — Michael J Brown
(74) *Attorney, Agent, or Firm* — Dority & Manning, P.A.

(57) ABSTRACT

A method, apparatus, and program for additive manufacturing. The additive manufacturing method may include solidifying at least a portion of a first layer (601) of build material (416) within a first scan region (902A). At least one of a build unit (400) and a build platform (310) may be moved to solidify at least a portion of the first layer (601) of build material (416) within a second scan region (902B). A second layer (602) of build material (416) may be provided over at least a portion of the first scan region (902A) and the second scan region (902B). A second layer (602) of build material (416) may be solidified within at least a portion of the third
(Continued)

scan region (902C), the third scan region (902C) may at least partially overlap and may be offset with relation to the first scan region (902A).

15 Claims, 9 Drawing Sheets

(51) Int. Cl.
*B22F 10/28* (2021.01)
*B33Y 10/00* (2015.01)
*B33Y 30/00* (2015.01)
*B33Y 50/02* (2015.01)
*B29C 64/393* (2017.01)
*B29C 64/165* (2017.01)
*B22F 12/41* (2021.01)
*B22F 10/366* (2021.01)
*B22F 12/37* (2021.01)
*B22F 12/67* (2021.01)
*B22F 12/70* (2021.01)

(52) U.S. Cl.
CPC ............ *B22F 12/41* (2021.01); *B29C 64/165* (2017.08); *B29C 64/393* (2017.08); *B33Y 10/00* (2014.12); *B33Y 30/00* (2014.12); *B33Y 50/02* (2014.12); *B22F 12/37* (2021.01); *B22F 12/67* (2021.01); *B22F 12/70* (2021.01)

(58) Field of Classification Search
CPC ........ B22F 12/70; B22F 10/28; B29C 64/165; B29C 64/268; B29C 64/393; B29C 64/282; B29C 64/153; B33Y 10/00; B33Y 30/00; B33Y 50/02; Y02P 10/25
USPC .......................................................... 419/1
See application file for complete search history.

(56) References Cited

U.S. PATENT DOCUMENTS

| | | | |
|---|---|---|---|
| 10,335,901 | B2 | 7/2019 | Ferrar et al. |
| 10,500,641 | B2 | 12/2019 | McClelland et al. |
| 10,814,393 | B2 | 10/2020 | Hellestam |
| 2014/0175708 | A1 | 6/2014 | Echigo et al. |
| 2015/0210013 | A1* | 7/2015 | Teulet ................... B29C 64/153 425/150 |
| 2015/0321255 | A1 | 11/2015 | Colin et al. |
| 2016/0136730 | A1 | 5/2016 | McMurtry et al. |
| 2017/0165748 | A1 | 6/2017 | Kamachi et al. |

* cited by examiner

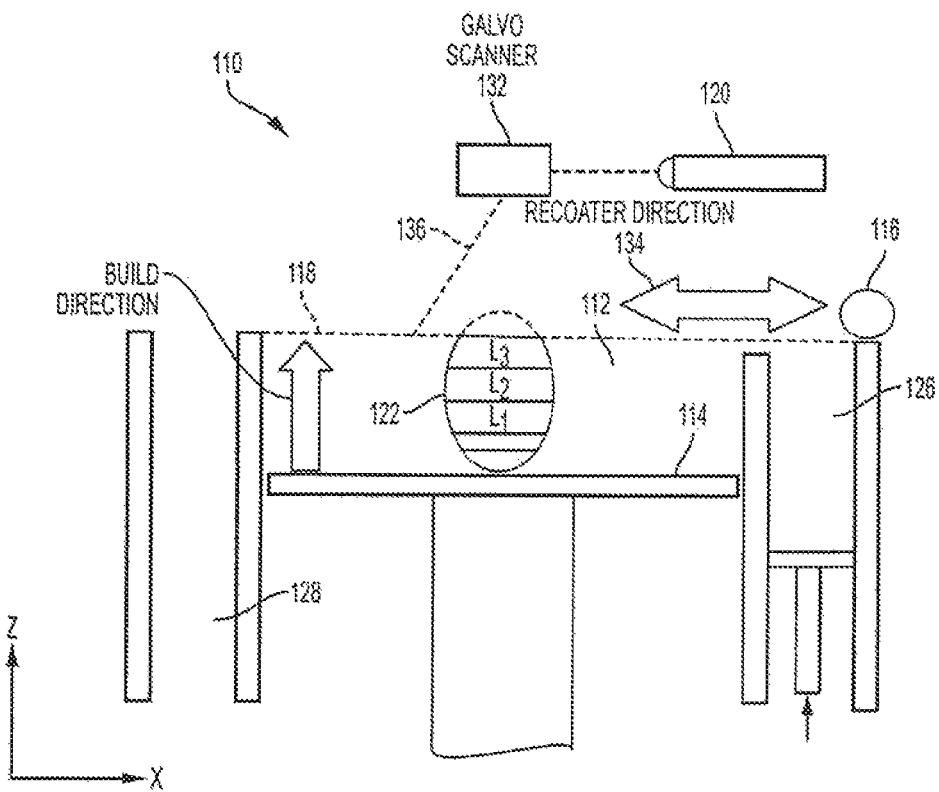
FIG. 1
PRIOR ART
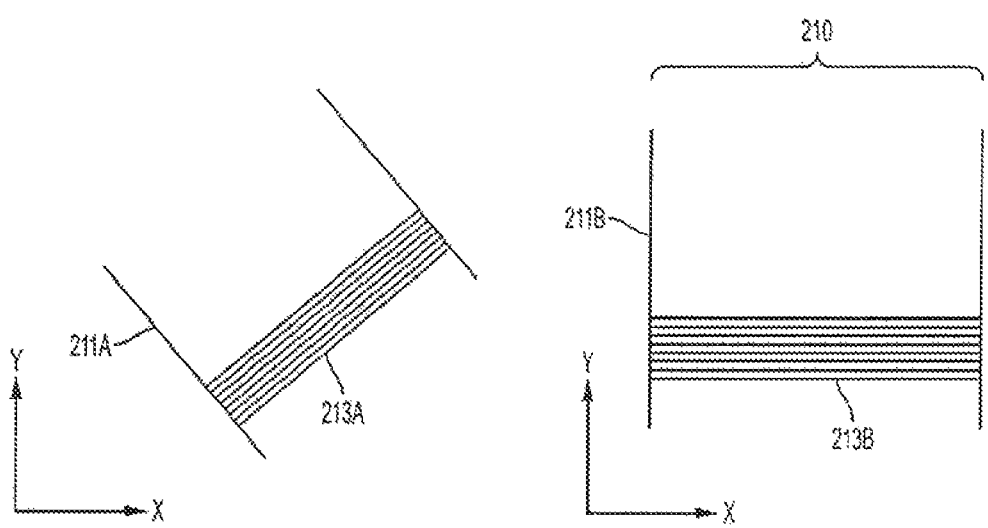
FIG. 2
PRIOR ART
FIG. 3
PRIOR ART

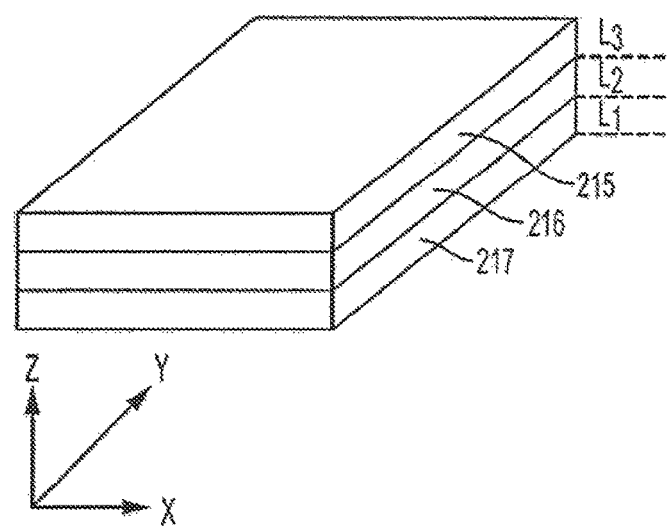
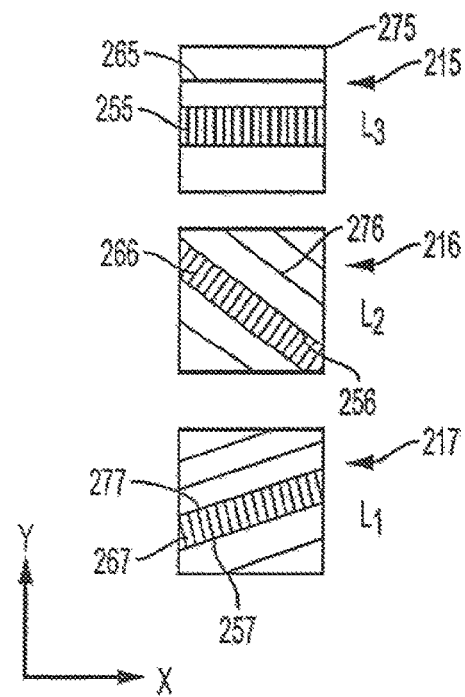
FIG. 4                    FIG. 5

SCAN FIELD VARIATION FOR ADDITIVE MANUFACTURING

PRIORITY INFORMATION

The present applicant claims priority to U.S. Provisional Patent Application Ser. No. 62/584,482 titled "Scan Field Variation for Additive Manufacturing" filed on Nov. 10, 2017, the disclosure of which is incorporated by reference herein.

FIELD

The disclosure relates to an improved method and apparatus for scanning a build material for use in additive manufacturing.

BACKGROUND

Additive manufacturing (AM) techniques may include electron beam freeform fabrication, laser metal deposition (LMD), laser wire metal deposition (LMD-w), gas metal arc-welding, laser engineered net shaping (LENS), laser sintering (SLS), direct metal laser sintering (DMLS), electron beam melting (EBM), powder-fed directed-energy deposition (DED), and three dimensional printing (3DP), as examples. AM processes generally involve the buildup of one or more materials to make a net or near net shape (NNS) object in contrast to subtractive manufacturing methods. Though "additive manufacturing" is an industry standard term (ISO/ASTM52900), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. As an example, a particular type of AM process uses an energy beam, for example, an electron beam or electromagnetic radiation such as a laser beam, to sinter or melt a powder material and/or wire-stock, creating a solid three-dimensional object in which a material is bonded together.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques. More specifically, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Electron beam melting (EBM) utilizes a focused electron beam to melt powder. These processes involve melting layers of powder successively to build an object in a metal powder.

AM techniques, examples of which are discussed above and throughout the disclosure, may be characterized by using a laser or an energy source to generate heat in the powder to at least partially melt the material. Accordingly, high concentrations of heat are generated in the fine powder over a short period of time. The high temperature gradients within the powder during buildup of the component may have a significant impact on the microstructure of the completed component. Rapid heating and solidification may cause high thermal stress and cause localized non-equilibrium phases throughout the solidified material. Further, since the orientation of the grains in a completed AM component may be controlled by the direction of heat conduction in the material, the scanning strategy of the laser in an AM apparatus and technique becomes an important method of controlling microstructure of the AM built component. Controlling the scanning strategy in an AM apparatus is further crucial for developing a component free of material defects, examples of defects may include lack of fusion porosity and/or boiling porosity.

FIG. 1 is schematic diagram showing a cross-sectional view of an exemplary conventional system 110 for direct metal laser sintering (DMLS) or direct metal laser melting (DMLM). The apparatus 110 builds objects, for example, the part 122, in a layer-by-layer manner (e.g., layers L1, L2, and L3, which are exaggerated in scale for illustration purposes) by sintering or melting a powder material (not shown) using an energy beam 136 generated by a source such as a laser 120. The powder to be melted by the energy beam is supplied by reservoir 126 and spread evenly over a build plate 114 using a recoater arm 116 traveling in direction 134 to maintain the powder at a level 118 and remove excess powder material extending above the powder level 118 to waste container 128. The energy beam 136 sinters or melts a cross sectional layer (e.g., layer L1) of the object being built under control of the galvo scanner 132. The build plate 114 is lowered and another layer (e.g., layer L2) of powder is spread over the build plate and object being built, followed by successive melting/sintering of the powder by the laser 120. The process is repeated until the part 122 is completely built up from the melted/sintered powder material. The laser 120 may be controlled by a computer system including a processor and a memory. The computer system may determine a scan pattern for each layer and control laser 120 to irradiate the powder material according to the scan pattern. After fabrication of the part 122 is complete, various post-processing procedures may be applied to the part 122. Post processing procedures include removal of excess powder, for example, by blowing or vacuuming, machining, sanding or media blasting. Further, conventional post processing may involve removal of the part 122 from the build platform/substrate through machining, for example. Other post processing procedures include a stress release process. Additionally, thermal and chemical post processing procedures can be used to finish the part 122.

The abovementioned AM processes is controlled by a computer executing a control program. For example, the apparatus 110 includes a processor (e.g., a microprocessor) executing firmware, an operating system, or other software that provides an interface between the apparatus 110 and an operator. The computer receives, as input, a three dimensional model of the object to be formed. For example, the three dimensional model is generated using a computer aided design (CAD) program. The computer analyzes the model and proposes a tool path for each object within the model. The operator may define or adjust various parameters of the scan pattern such as power, speed, and spacing, but generally does not program the tool path directly. One having ordinary skill in the art would fully appreciate the abovementioned control program may be applicable to any of the abovementioned AM processes. Further, the abovementioned computer control may be applicable to any subtractive manufacturing or any pre or post processing techniques employed in any post processing or hybrid process.

The above additive manufacturing techniques may be used to form a component from stainless steel, aluminum, titanium, cobalt chrome, among other metal materials or any alloy. For example, the above alloys may include materials with trade names, Haynes 188®, Haynes 625®, Super Alloy Inconel 625™, Chronin® 625, Altemp® 625, Nickelvac® 625, Nicrofer® 6020, Inconel 188, and any other material having material properties attractive for the formation of components using the abovementioned techniques.

In the abovementioned example, a laser and/or energy source is generally controlled to form a series of solidification lines (hereinafter interchangeably referred to as hatch lines, solidification lines and raster lines) in a layer of powder based on a pattern. A pattern may be selected to decrease build time, to improve or control the material properties of the solidified material, to reduce stresses in the completed material, and/or to reduce wear on the laser, galvanometer scanner, and/or electron-beam. Various scanning strategies have been contemplated in the past, and include, for example, chessboard patterns and/or stripe patterns.

One attempt at controlling the stresses within the material of the built AM component involves the rotation of stripe regions containing a plurality of adjoining parallel vectors, as solidification lines, that run perpendicular to solidification lines forming the boundaries of the stripe region for each layer during an AM build process. Parallel solidification lines, bounded by and perpendicular to a stripe, are rotated for each layer of the AM build. One example of controlling the scanning strategy in an AM apparatus is disclosed in U.S. Pat. No. 8,034,279 B2 to Dimter et al., titled "Method and Device for Manufacturing a Three-dimensional Object," which is hereby incorporated by reference in its entirety.

FIGS. 2 and 3 represent the abovementioned rotating stripe strategy (e.g., identified generally by scan lines 210 of a laser). The laser is scanned across the surface of a powder to form a series of solidification lines 213A, 213B. The series of solidification lines form a layer of the build and are bound by solidification lines in the form of stripes 211A and 211B that are perpendicular to the solidification lines 213A and 213B forming the boundaries of each stripe region. The stripe regions bounded by solidification lines 211A and 211B form a portion of a larger surface of the layer to be built. In forming a part, a bulk of the part cross section is divided into numerous stripe regions (regions between two solidified stripes containing transverse solidification lines). A stripe orientation is rotated for each layer formed during the AM build process as shown in FIGS. 2 and 3. A first layer may be formed with a series of parallel solidification lines 213A, in a stripe region, formed substantially perpendicular to and bounded by solidified stripes 211A. In a subsequent layer formed over the first layer, the stripes 211B are rotated as shown in FIG. 3. By creating a stripe boundary for the solidified lines 213A and 213B through a set of solidified stripes 211B that are rotated with respect to the previous layer, solidification lines 213B, which are be formed perpendicular to and are bounded by stripes 211B are also be rotated with respect the solidification lines 213A of the previous layer.

Using the abovementioned rotating stripe strategy, the need exists to further create variance in each layer when employing a build for use in a large scale AM apparatus as discussed below. By employing the various embodiments disclosed, build efficiency can be further increased and/or improvement over control and/or efficiency of heat buildup within each layer and previous/subsequent layers. Further, the microstructure of the part built using the AM process can be altered by controlling the pattern of stripe regions and solidification lines within the stripe region.

In a large scale AM apparatus using at least one mobile build unit and/or a mobile build platform as discussed below, the abovementioned strategies may be employed. However, when forming a scan region which borders another scan region, there exists a further need to create variance within the build to control the metallurgy of the completed component while still maintaining efficiency.

BRIEF DESCRIPTION

Aspects and advantages will be set forth in part in the following description, or may be obvious from the description, or may be learned through practice of the invention.

In one aspect, a method for additive manufacturing is disclosed, the method includes solidifying at least a portion of a first layer of build material within a first scan region. A build unit may be moved to a second scan region, and at least a portion of the second scan region may be solidified within a second scan region. A second layer of build material may be provided over at least a portion of the first scan region. A second layer of build material may be solidified within at least a portion of a third scan region, the third scan region may at least partially overlap and may be offset with relation to the first scan region.

In another aspect, a method for additive manufacturing is disclosed, the method includes solidifying at least a portion of a first layer of build material within a first scan region. A build platform may be moved to a second scan region to solidify at least a portion of the build material within the second scan region. A second layer of build material may be provided over at least a portion of the first scan region. A second layer of build material may be solidified within at least a portion of a third scan region, the third scan region may at least partially overlap and may be offset with relation to the first scan region.

In another aspect, a non-transitory computer readable medium storing a program configured to cause a computer to execute an additive manufacturing method is disclosed. The additive manufacturing method may include solidifying at least a portion of a first layer of build material within a first scan region. At least one of a build unit and a build platform may be moved to a second scan region, at least a portion of the first layer of build material may be solidified within the second scan region. A second layer of build material may be provided over at least a portion of the first scan region. A second layer of build material may be solidified within at least a portion of a third scan region, the third scan region may at least partially overlap and may be offset with relation to the first scan region.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which:

FIG. 1 is a side view diagram of a conventional additive manufacturing technique used to form at least part of a component;

FIG. 2 is a top view depicting a conventional hatch and stripe pattern used to form at least a part of a component;

FIG. 3 is a top view depicting a conventional hatch and stripe pattern used to form at least a part of a component;

FIG. 4 is a perspective view, depicting example layers of component build during an AM process;

FIG. 5 is a top view depicting a hatch and stripe pattern used to form each layer of the component depicted in FIG. 4;

Figure 6:
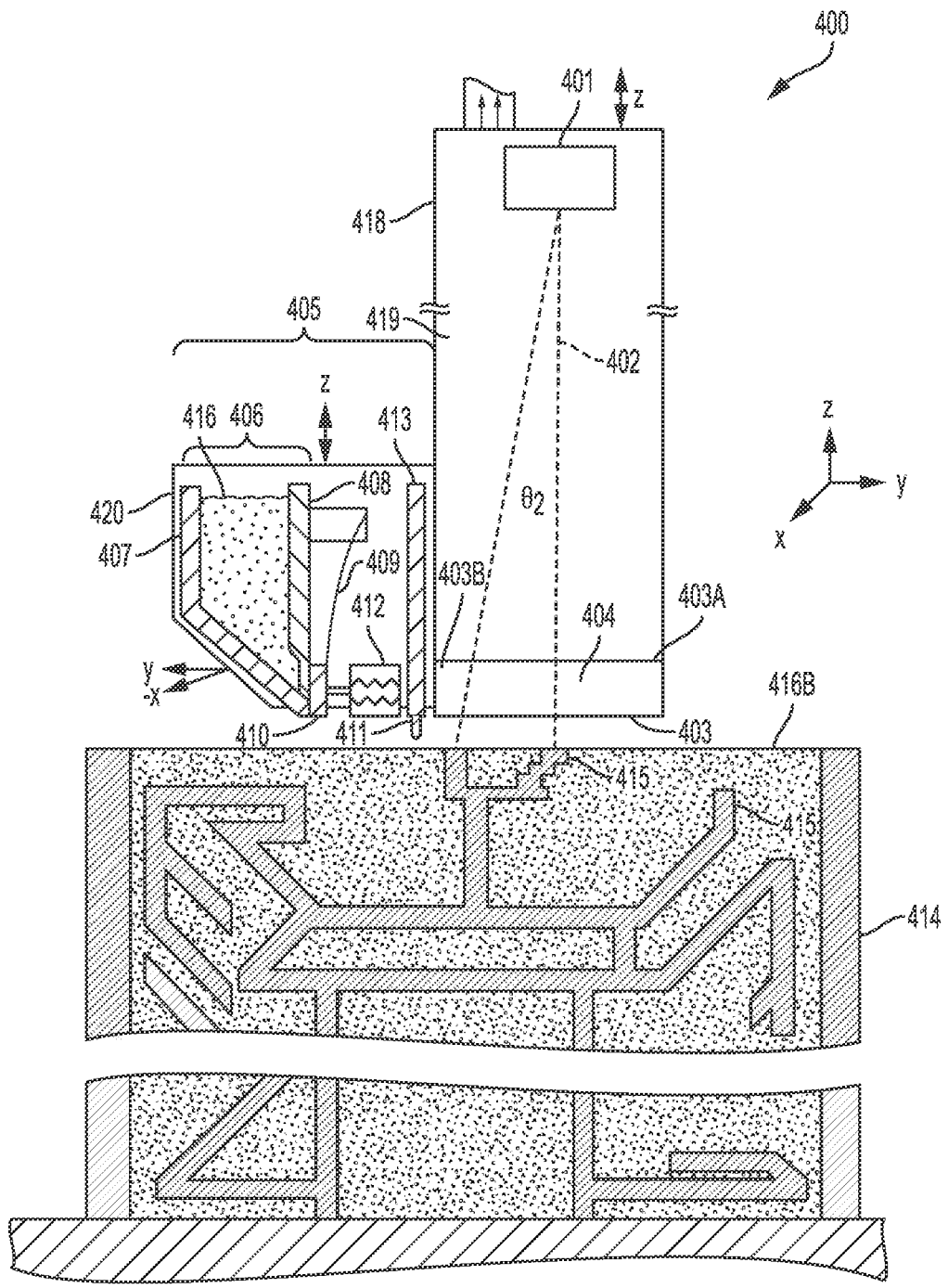
FIG. 6 is a side view cross section of a build unit in accordance with one aspect of the disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

When using any of the abovementioned AM techniques to form a part by at least partially melting a powder, a scan of the laser across the powder material, in a raster scan fashion is used to create hatch scans (hereinafter referred to interchangeably as hatch scans, rasters, scan lines, or solidification lines). During an AM build, the abovementioned solidification lines are used to form the bulk of a part cross section. Contour scans, may further be used to outline the edges of the part cross section. During a raster scan process, the energy source or laser is turned on, increased in power and/or focused in regions where a solid portion of the AM build is desired, and switched off, defocused, pulsed, and/or decreased in power where melt formation of the object's cross section in that layer are not desired. During a raster scan process, at least partially melting of powder and formation of solidification is repeated along adjacent solidification lines, for example, to form a single melted and fused cross section of the object to be built, while the contour scans create a discrete border or edge of the part. In the example AM apparatus using a powder bed, once the melt formation of one cross section of the object being built is completed, the apparatus coats the completed cross-sectional surface with an additional layer of powder. The process is repeated until the object is complete. It is noted that while a build material is referenced as a powder throughout the specification, any build material may be used to form each layer (e.g, a foil and/or thin sheet of build material). Further, while the terms solidification, melting, and partially solidifying are used throughout the specification, it is noted that the disclosure is intended to be applicable to any type of densification of a build material. For example, the disclosure thought may be applicable to a binder jetting of build material. Binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. For example, the liquid binding agent may be a photo-curable polymer or another liquid bonding agent. Other suitable additive manufacturing methods and variants are intended to be within the scope of the present subject matter.

For the above reasons, the laser and/or energy source is controlled to form a series of solidification lines in a layer of powder using a pattern for at least the following reasons; to decrease build time, to control the heat buildup within the powder and/or to increase the efficiency of the build, to improve and/or control the material properties of the solidified material, to reduce stresses in the completed material, and/or to reduce wear on the laser and/or galvanometer scanner.

As shown in FIGS. 4 and 5, a built AM component includes a plurality of layers 215, 216, 217. One example of the abovementioned strategy is shown, for example, a first layer 217 may be divided by software into several stripe regions bounded by, stripes 257 and 277 formed as solidification lines. The stripes 257 and 277 may form a boundary for individually formed parallel adjoining vectors or solidification lines 267. The surface of the part includes a plurality of stripes covering the surface to be built. As shown in FIG. 5, each stripe region is bounded by solidified stripes 257 and 277 in layer 217 form a boundary for a series of parallel solidified lines 267. The parallel solidification lines 267 are perpendicular to the solidified stripe boundaries 257 and 277. The stripes are oriented at a first angle in layer 217 with the perpendicular solidification lines 267 being formed substantially perpendicular to the stripes 257 and 277. The stripe region bound by solidified stripes 256 and 257 on a second layer 216 are angled with respect to the solidified stripe boundaries 257 and 277 on previous layer 217. Accordingly, solidification lines 266 that run perpendicular to solidified stripes 256 and 276 are also be angled with respect to the solidification lines 267 on previous layer 217. As the build progresses, a next layer having stripes 265 and 275 on a third layer 215 are angled with respect to stripes 257 and 277 on layer 217; and stripes 256 and 276 on layer 216. It should be appreciated that as used herein, the terms "first," "second," and "third" may be used interchangeably to distinguish one print region from another and are not intended to signify location or importance of the individual regions, nor the order in which the regions must be printed.

Additional details for scan strategies that can be used in accordance with the present invention may be found in U.S. patent application Ser. No. 15/451,108, titled "Triangle Hatch Pattern for Additive Manufacturing," filed Mar. 7, 2017; U.S. patent application Ser. No. 15/451,043, titled "Leg Elimination Strategy for Hatch Pattern," filed Mar. 6, 2017; U.S. patent application Ser. No. 15/459,941, titled "Constantly Varying Hatch for Additive Manufacturing," filed Mar. 15, 2017, the disclosures of which are incorporated herein by reference.

FIG. 6 shows an example of one embodiment of a large-scale AM apparatus according to the present invention. The apparatus comprises a positioning system (not shown), a build unit 400 comprising an irradiation emission directing device 401, a laminar gas flow zone 404, and a build plate beneath an object being built 415. The maximum build area is defined by the positioning system (not shown), instead of by a powder bed as with conventional systems, and the build area for a particular build can be confined to a build envelope 414 that may be dynamically built up along with the object. In general, the positioning system used in the present invention may be any multidimensional positioning system such as a gantry system, a delta robot, cable robot, robot arm, etc. The irradiation emission directing device 401 may be independently moved inside of the build unit 400 by a second positioning system (not shown). The atmospheric environment outside the build unit, i.e. the "build environment," or "containment zone," may be controlled such that the oxygen content is reduced relative to typical ambient air, and so that the environment is at reduced pressure. In some embodiments, the recoater used is a selective recoater. One embodiment of a selective recoater 411 is illustrated in FIG. 6.

There may also be an irradiation source that, in the case of a laser source, originates the photons comprising the laser irradiation that is directed by the irradiation emission directing device. When the irradiation source is a laser source, then the irradiation emission directing device may be, for example, a galvo scanner, and the laser source may be located outside the build environment. Under these circumstances, the laser irradiation may be transported to the irradiation emission directing device by any suitable means, for example, a fiber-optic cable. When the irradiation source is an electron source, then the electron source originates the electrons that comprise the e-beam that is directed by the irradiation emission directing device. When the irradiation source is an electron source, then the irradiation emission directing device may be, for example, a deflecting coil. When a large-scale additive manufacturing apparatus according to an embodiment of the present invention is in operation, if the irradiation emission directing devices directs a laser beam, then generally it is advantageous to include a gasflow device 403 providing substantially laminar gas flow zone. An electron-beam may also be used in instead of the laser or in combination with the laser. An e-beam is a well-known source of irradiation. For example, U.S. Pat. No. 7,713,454 to Larsson titled "Arrangement and Method for Producing a Three-Dimensional Product" ("Larsson") discusses e-beam systems, and is incorporated herein by reference.

The gasflow device 403 may provide gas to a pressurized outlet portion 403A and a vacuum inlet portion 403B which may provide gas flow to a gasflow zone 404, and a recoater 405. Above the gasflow zone 404 there is an enclosure 418 which may contain an inert environment 419. The recoater 405 may include a hopper 406 comprising a back plate 407 and a front plate 408. The recoater 405 also has at least one actuating element 409, at least one gate plate 410, a recoater blade 411, an actuator 412, and a recoater arm 413. The recoater is mounted to a mounting plate 420. FIG. 6 also shows a build envelope 414 that may be built by, for example, additive manufacturing or Mig/Tig welding, an object being formed 415, and powder 416 contained in the hopper 406 used to form the object 415. In this particular example, the actuator 412 activates the actuating element 409 to pull the gate plate 410 away from the front plate 408. In an embodiment, the actuator 412 may be, for example, a pneumatic actuator, and the actuating element 409 may be a bidirectional valve. In an embodiment, the actuator 412 may be, for example, a voice coil, and the actuating element 409 may be a spring. There is also a hopper gap 417 between the front plate 408 and the back plate 407 that allows powder to flow when a corresponding gate plate is pulled away from the powder gate by an actuating element. The powder 416, the back plate 407, the front plate 408, and the gate plate 410 may all be the same material. Alternatively, the back plate 407, the front plate 408, and the gate plate 410 may all be the same material, and that material may be one that is compatible with any desired material, such as cobalt-chrome for example. In this particular illustration of one embodiment of the present invention, the gas flow in the gasflow zone 404 flows in the x direction, but could also flow in any desired direction with respect to the build unit. The recoater blade 411 has a width in the x direction. The direction of the irradiation emission beam when θ2 is approximately 0 defines the z direction in this view. The gas flow in the gasflow zone 404 may be substantially laminar. The irradiation emission directing device 401 may be independently movable by a second positioning system (not shown). This illustration shows the gate plate 410 in the closed position.

Further it is noted that while the abovementioned selective powder recoating mechanism 405 only includes a single powder dispenser, the powder recoating mechanism may include multiple compartments containing multiple different material powders are also possible. Similarly, the abovementioned apparatus may include plurality of recoater mechanisms.

When the gate plate 410 in the open position, powder in the hopper is deposited to make fresh powder layer 416B, which is smoothed over by the recoater blade 411 to make a substantially even powder layer. In some embodiments of the present invention, the substantially even powder layer may be irradiated at the same time that the build unit is moving, which would allow for continuous operation of the build unit and thus faster production of the object.

Figure 7:
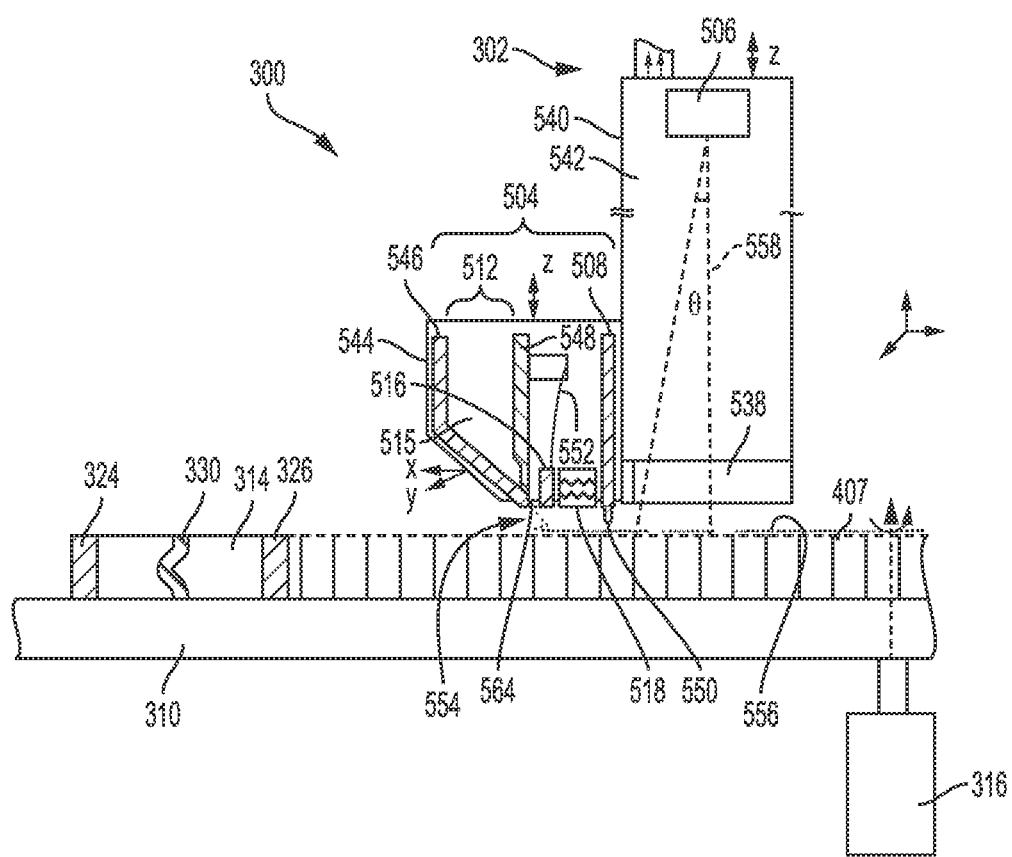
FIG. 7 is a side view cross section of a build unit and part of the rotating build platform of an additive manufacturing apparatus in accordance with one aspect of the disclosure.

FIG. 7 shows a side view of a manufacturing apparatus 300 including details of the build unit 302, which is pictured on the far side of the build platform. The mobile build unit 302 includes an irradiation beam directing mechanism 506, a gas-flow mechanism (e.g., similar to gasflow device 403) with a gas inlet and gas outlet (not shown) providing gas flow to a gas flow zone in direction 538, and a powder recoating mechanism 504. In this example, the flow direction is substantially along the X direction. Above the gas flow zone 538, there may be an enclosure 540 that contains an inert environment 542. The powder recoating mechanism 504, which is mounted on a recoater plate 544, has a powder dispenser 512 that includes a back plate 546 and a front plate 548. The powder recoating mechanism 504 also includes at least one actuating element 552, at least one gate plate 516, a recoater blade 550, an actuator 518 and a recoater arm 508. In this embodiment, the actuator 518 activates the actuating element 552 to pull the gate plate 516 away from the front plate 548, as shown in FIG. 7. There is also a gap 564 between the front plate 548 and the gate plate 516 that allows the powder to flow onto the rotating build platform 310 when the gate plate 516 is pulled away from the front plate 548 by the actuating element 552. The rotating build platform 310 may be rotatably controlled by a motor 316.

FIG. 7 shows a build unit 302 with the gate plate 516 at an open position. The powder 515 in the powder dispenser 512 is deposited to make a fresh layer of powder 554, which is smoothed over a portion of the top surface (i.e. build or work surface) of the rotating build platform 310 by the recoater blade 510 to make a substantially even powder layer 556 which is then irradiated by the irradiation beam 558 to a fused layer that is part of the printed object 330. In some embodiments, the substantially even powder layer 556 may be irradiated at the same time as the build unit 302 is moving, which allows for a continuous operation of the build unit 302 and hence, a more time-efficient production of the printed or grown object 330. The object being built 330 on the rotating build platform 310 is shown in a powder bed 314 constrained by an outer build wall 324 and an inner build wall 326. In this particular illustration of one embodiment of the present invention, the gas flow in the gasflow zone 538 flows in the x direction, but could also flow in any desired direction with respect to the build unit.

It is noted that while the abovementioned selective powder recoating mechanism 504 only includes a single powder dispenser, the powder recoating mechanism may include multiple compartments containing multiple different material powders are also possible. Further, while a single recoater apparatus is shown, the invention is applicable to an apparatus having a plurality of recoater apparatuses.

Further, it should be appreciated that according to alternative embodiments, the abovementioned additive manufacturing machines and build units may be configured for using a "binder jetting" process of additive manufacturing. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. For example, the liquid binding agent may be a photo-curable polymer or another liquid bonding agent. Other suitable additive manufacturing methods and variants are intended to be within the scope of the present subject matter.

Additional details for a build units and positioning mechanisms for a single and/or multiple units that can be used in accordance with the present invention may be found in U.S. patent application Ser. No. 15/610,177, titled "Additive Manufacturing Using a Mobile Build Volume," filed May, 31, 2017; U.S. patent application Ser. No. 15/609,965, titled "Apparatus and Method for Continuous Additive Manufacturing," filed May 31, 2017; U.S. patent application Ser. No. 15/610,113, titled "Method for Real-Time Simultaneous Additive and Subtractive Manufacturing With a Dynamically Grown Build Wall," filed May 31, 2017; U.S. patent application Ser. No. 15/610,214, titled "Method for Real-Time Simultaneous and Calibrated Additive and Subtractive Manufacturing," with attorney docket number 037216.00109, and filed May 31, 2017; U.S. patent application Ser. No. 15/609,747, titled "Apparatus and Method for Real-Time Simultaneous Additive and Subtractive Manufacturing with Mechanism to Recover Unused Raw Material," filed May 31, 2017; U.S. patent application Ser. No. 15/406,444, titled "Additive Manufacturing Using a Dynamically Grown Build Envelope," filed Jan. 13, 2017; U.S. patent application Ser. No. 15/406,467, titled "Additive Manufacturing Using a Mobile Build Volume," filed Jan. 13, 2017; U.S. patent application Ser. No. 15/406,454, titled "Additive Manufacturing Using a Mobile Scan Area," filed Jan. 13, 2017; U.S. patent application Ser. No. 15/406,461, titled "Additive Manufacturing Using a Selective Recoater," filed Jan. 13, 2017; U.S. patent application Ser. No. 15/406,471, titled "Large Scale Additive Machine," filed Jan. 13, 2017, the disclosures of which are incorporated herein by reference.

While building a component using any of the build units mentioned above, controlling the positioning of the build unit with relation to the build material and control of the process parameters to control energy imparted into the build material is important to both the metallurgical and/or structural quality and/or dimensional accuracy of the completed component. For example, when using a laser, a laser energy imparted into the build material is derived from the laser power, the scan speed, and the scan spacing. The laser power, is energy directed into the built part (e.g., the build material and the component being built) as opposed to the wattage input into the laser. Thus, the laser power may comprise a focus of the laser, a pulse of the laser, and/or wattage of the laser. Scan speed is the velocity at which the laser moves across the build profile. The scan speed may be determined by the velocity at which galvanometer scanner directs the laser, for example. Scan spacing is the spacing between each solidification line formed in the build material. Any of the abovementioned process parameters may be controlled to impart a specific energy into the build material. Thus, while not limited as such, an energy density may be controlled by controlling any one of or a combination of the abovementioned values. Excessive energy densities during a build process could result in warping, dimensional inaccuracies, and/or boiling porosity in the finished component. Energy densities that are too low could result in improper bonding of the completed component. Thus, throughout the build the energy density may be constantly controlled based on an estimated or detected energy density build up and/or decrease in energy density within a region of the build. Any of the abovementioned variables may be altered within a region to assure a consistent build and/or to control the metallurgical properties of the completed layer and/or multiple completed layers.

Further, the formation of components using a build unit, which may be used to form components that are larger than a typical AM apparatus, requires consideration of the regions between each scan region and/or the border region between adjacent scan regions. As discussed below, a scan region may include a location of a build unit relative to the build material, for example. Once a first scan region is completed and the build unit and/or the build platform is moved to a second scan region over a second portion of the layer of build material to be at least partially solidified, it is necessary to consider the solidification of the build material in areas that are either between the abovementioned first and second scan regions if the first scan region and second scan region are spaced, and/or the border between the first scan region and the second scan region if the two regions are adjacent.

Figure 8:
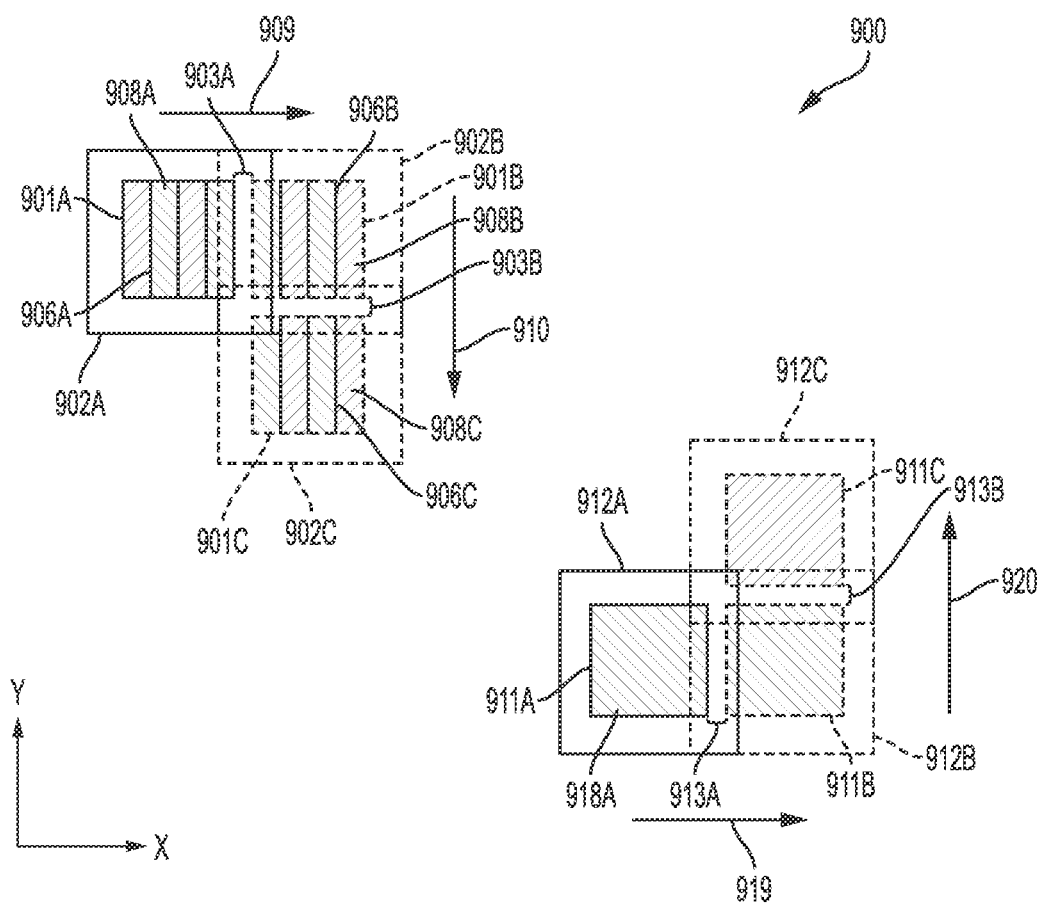
FIG. 8 is a top view depicting example orientations of the build unit and scan zones in accordance with one aspect of the disclosure.

One example implementation is shown in FIG. 8. FIG. 8 shows an example top view of a build units movement within a build area 900 while forming a layer of an AM build. The build area 900 may be a powder bed and/or may be an area supplied with powder and/or build material by a build unit. The build area may also be a layer of foil. A build unit may first be positioned in a first position and/or orientation represented by 902A. It is noted that the outline 902A may represent a scan-able region and/or a build unit outline and is simplified for clarity purposes. Further, it is noted that portion 902A may be referred to interchangeably as a scan-able region or a build unit and may include a larger or smaller area in relation to a scan zone 901A. The scan zone 901A may be a portion of a scan-able region 902A which may represent a surface area over which the irradiation source is capable of at least partially fusing a build material at a specific location of the build unit e.g., position 902A. For example, with reference to FIG. 6, a scan-able region may include a surface area of the build material 416B and/or fused region 415 over which the irradiation source 402 is capable of operating (e.g., capable of fusing and/or sintering the build material) while the build unit 400 is in a single orientation with respect to the build surface 415 and/or 416B. In other words regions 901A and 901B, may represent a surface that is at least a portion of a total scan-able region while a build unit and/or platform is in a single stationary orientation.

As shown in FIG. 8, first scan zone 901A may be near a second scan zone 901B. The first scan zone may represent a portion of a scan-able region 902A at a first location of the build unit (e.g., build units 302 and/or 400 as shown in FIGS. 6 and 7) and/or may represent a first position of the build platform 310 shown in FIG. 7 with respect to the build unit 302, for example. A second scan zone 901B may represent a portion of a scan-able region 902A at a second location of the build unit (e.g., build units 302 and/or 400 as shown in FIGS. 6 and 7) and or may represent a second position of the build platform 310 shown in FIG. 7 with respect to the build unit 302, for example. The first scan zone may be irradiated to form a series of solidification lines 908A between each stripe 906A. It is noted however, that this example is not limiting, for example, the first scan zone 901A may be formed using any of the abovementioned and incorporated raster scan schemes. Likewise, the second scan zone 902B may be formed by irradiating the powder along a series of solidification lines 908B bounded by stripes 906A. While not shown in FIG. 8, the stripe and/or solidification line scheme may be varied when forming the first scan zone 901A and the second scan zone 901B. Further, a third scan zone 901C within a third scan-able region 902C may be at least partially solidified by irradiating the build material along a series of solidification lines bounded by stripes 906C. As mentioned above, the stripe and/or solidification line scheme may be varied when forming the first scan zone 901A and the second scan zone 901B and the third scan zone 901C and any combination of solidification line and/or stripe schemes may be used. Further, it is noted that while arrows 909 and 910 show example movements of the build unit, the first, second, and third scan zones may be solidified in any order.

As another example, scan zones 911A, 911B, and 911C may also be formed at three separate positions of the build unit. Similarly to the scenario above, because of the overlap of each scan-able region 912A-C, portions 913A and/or 913B may be formed by the build while the build unit remains stationary after any single or multiple scan zones are formed that border portions 913A and/or 913B. It is further noted that portions 903A-B and/or 913A-B could be formed by moving the build unit (e.g., along directions 919 and 920) to an intermediate position between each of the scan zones 901A-C and/or 911A-C as well. When forming a layer of the AM build by at least partially solidifying a build material in scan zone 911A, 911B, and/or 911C, an interlocking solidification path may be used in each of the scan zones 911A, 911B, and/or 911C (e.g., as shown in FIG. 8) the interlocking solidification paths may be used to at least partially solidify space 913A and/or 913B between the first, second, and/or third scan regions 911A-C. Further, any of the abovementioned process parameters may be varied when connecting scan regions 911A-C.

It is noted that FIG. 8 shows a limited number of possible positions for simplicity purposes, it each of the abovementioned examples, the build unit may further progress to any position within the build area 900 to at least partially solidify a region and the same inventive principles may be applied. One having ordinary skill in the art would further appreciate that the abovementioned scan zones could be solidified in any desired order and the examples are not limiting. Further, one having skill in the art would further appreciate that the current invention could be applied to various possible AM build scenarios over each layer being formed.

Figure 9:
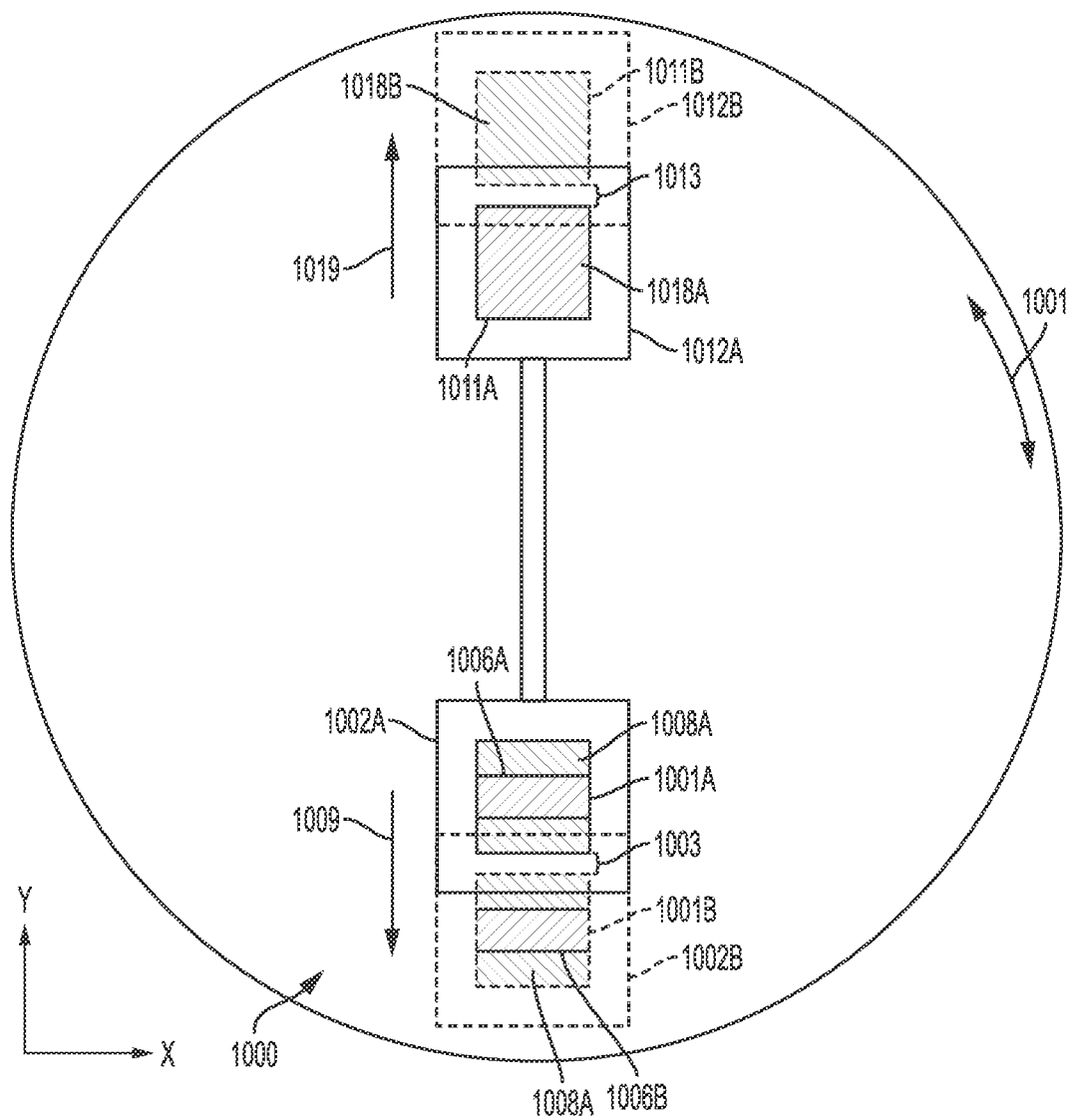
FIG. 9 is a top view depicting example orientations of a build unit and scan zones in accordance with one aspect of the disclosure.

Another example implementation is shown in FIG. 9. FIG. 9 represents an example top view of a build unit movement within a mobile build area 1000, when forming at least one layer of an AM build. The mobile build area 1000 may be rotatable along directions shown by arrow 1001. The build area 1000 may be a powder bed and/or may be an area supplied with powder and/or build material by the build unit. A build unit may first be positioned in a first position and/or orientation represented by 1012A. It is noted that the outline 1012A may represent a scan-able region and/or a build unit outline and is simplified for clarity purposes. Further, it is noted that portion 1012A may be referred to interchangeably as a scan-able region or a build unit and may include a larger or smaller area in relation to a scan zone 1012A. As mentioned above, the scan zone 1012A may be a portion of a scan-able region 1012A which may represent a surface area over which the irradiation source is capable of at least partially fusing a build material at a specific location of the build unit e.g., position 1012A. For example, with reference to FIG. 7, a scan-able region may include a surface area of the powder 314 and/or fused region 330 over which the irradiation source 558 is capable of operating (e.g., capable of fusing and/or sintering the build material) while the build unit 302 is in a single orientation with respect to the build surface 300. In other words regions 1018A and 1018B, may represent a surface that is at least a portion of a total scan-able region 1012A and 1012B while a build unit and/or platform 1000 is in a single stationary orientation.

As shown in FIG. 9, first scan zone 1011A may be near a second scan zone 1011B. The first scan zone may represent a portion of a scan-able region 1012A at a first location of the build unit and/or may represent a first position of the build platform 1000 with respect to the build unit, for example. A second scan zone 1011B may represent a portion of a scan-able region 1012B at a second location of the build unit and/or platform 1000. The first scan zone may be irradiated to form a series of solidification lines 1018A which may be formed across the entire surface of the build zone 1011A and or may be bounded by a single and/or plurality of stripes 1006A. It is noted however, that this example is not limiting, for example, the first scan zone 1012A may be formed using any of the abovementioned and incorporated raster scan schemes. Likewise, the second scan zone 1012B may be formed by irradiating the powder along a series of solidification lines 1018B. While not shown in FIG. 9, the stripe and/or solidification line scheme may be varied when forming the first scan zone 1012A and the second scan zone 1012B. It is noted that while arrows 1019 and 1009 show example movements of the build unit in a radial direction of the build platform 1000, the first and second scan zones may be solidified in any order.

When forming a layer of the AM build by at least partially solidifying a build material in scan zone 1011A, and/or 1011B, an the solidification paths 1018A and 1018B may be formed as alternately interlocking solidification paths within region 1013 (e.g., as shown in FIG. 8) the interlocking solidification paths may be used to at least partially solidify space 1013 between the first and second scan regions 1011A-B. Further, any of the abovementioned process parameters may be varied when connecting scan regions 1011A-B.

As another example, scan zones 1001A and 1001B may also be formed at two separate positions of the build unit. Similarly to the scenario above, because of the overlap of each scan-able region 1002A-B, portion 1003 may be formed by the build while the build unit remains stationary after any single or multiple scan zones are formed that border portion 1003. It is further noted that portions 1013 and/or 1003 could be formed by moving the build unit to an intermediate position between each of the scan zones 1011A-B and/or 1001A-B as well.

As mentioned above, the stripe and/or solidification line scheme may be varied when forming the first scan zone 1001A and the second scan zone 1001B and any combination of solidification line and/or stripe schemes may be used. Further, it is noted that while arrows 1009 and 1019 show example movements of the build unit, the first and second scan zones may be solidified in any order. When forming a layer of the AM build by at least partially solidifying a build material in scan zone 1001A and 1001B, an interlocking stripe scheme, as shown in FIG. 9 may be used in space 1003 between the first and second scan regions 1001A-B. Further, any of the abovementioned process parameters may be varied when connecting scan regions 1001A-B.

As mentioned above, in the above examples, scan-able region may represent a surface area over which the irradiation source is capable of at least partially fusing a build material at a specific location of the build unit. For example, with reference to FIG. 8, a scan-able region may include a surface area of the powder 902A and/or fused region 901A over which the irradiation source (e.g., ref. 402 in FIG. 6) is capable of operating (e.g., capable of fusing and/or sintering the build material) while the build unit 400 is in a single orientation with respect to the build surface 902A and/or 901A. In other words regions 902A and 901A, may represent a surface that is at least a portion of a total scan-able region while a build unit and/or platform is in a single stationary orientation. For example purposes, portions 902A will be hereinafter referred to as a scan-able and/or scan region, over which a build unit is capable of at least partially fusing build material for each location of the build unit, wherein the footprint of the build unit may be shown by outline 902A.

As shown in FIG. 8, each of the scan regions (e.g 901A and/or 911A) may be selected by software which divides each layer of a desire AM build into build unit positions and raster-scan regions. Each scan region 901A and/or 911A may include solidification lines 908A which may be bounded by a stripe 906A. As mentioned above, each stripe may be a separate solidification line or may simply represent a border for each of the solidification lines 908A. If the stripes 906A are borders an irradiation source may follow a path along a build material to form each solidification line 908A and may be defocused, pulsed, decreased in power, and/or turned off at the stripe 906A.

In one aspect of the disclosure, the solidification lines of each of a first scan region (e.g., 902A) and the second scan region (e.g., 902B) may be formed so as to interlock within the space 903A between each scan region. The solidification lines 908A and 908B may be formed so as to interlock at alternating intervals within space 903A between the two scan regions. Additional details for interlocking solidification line schemes that can be used in accordance with the present invention may be found in U.S. Provisional Application No. 62/584,553, titled "Interlace Scanning Strategies and Uses Thereof," to Gansler et al., filed Nov. 10, 2017, the contents of which are hereby incorporated by reference.

Further, when forming a layer of the AM build by at least partially solidifying a build material in scan zone 902A and/or 902B, excessive heat build-up and/or decreased temperature may occur at various regions of space 903A between the first scan region 902A and the second scan region 902B. In order to compensate for excessive heat build-up in space 903A, the process parameters may be adjusted to assure that the layer being built has the desired properties. For example, the solidification lines formed in region 903A may be formed with different process parameters than solidification lines 902A and 902B to compensate for any excessive heat build-up within space 903A. Additional details for the alteration of process parameters between two or more scan regions that can be used in accordance with the present invention may be found in U.S. application Ser. No. 15/711,808, titled "Scanning Strategy for Perimeter and Region Isolation," to Jones et al., filed Sep. 21, 2017, the contents of which are hereby incorporated by reference.

Figure 10:
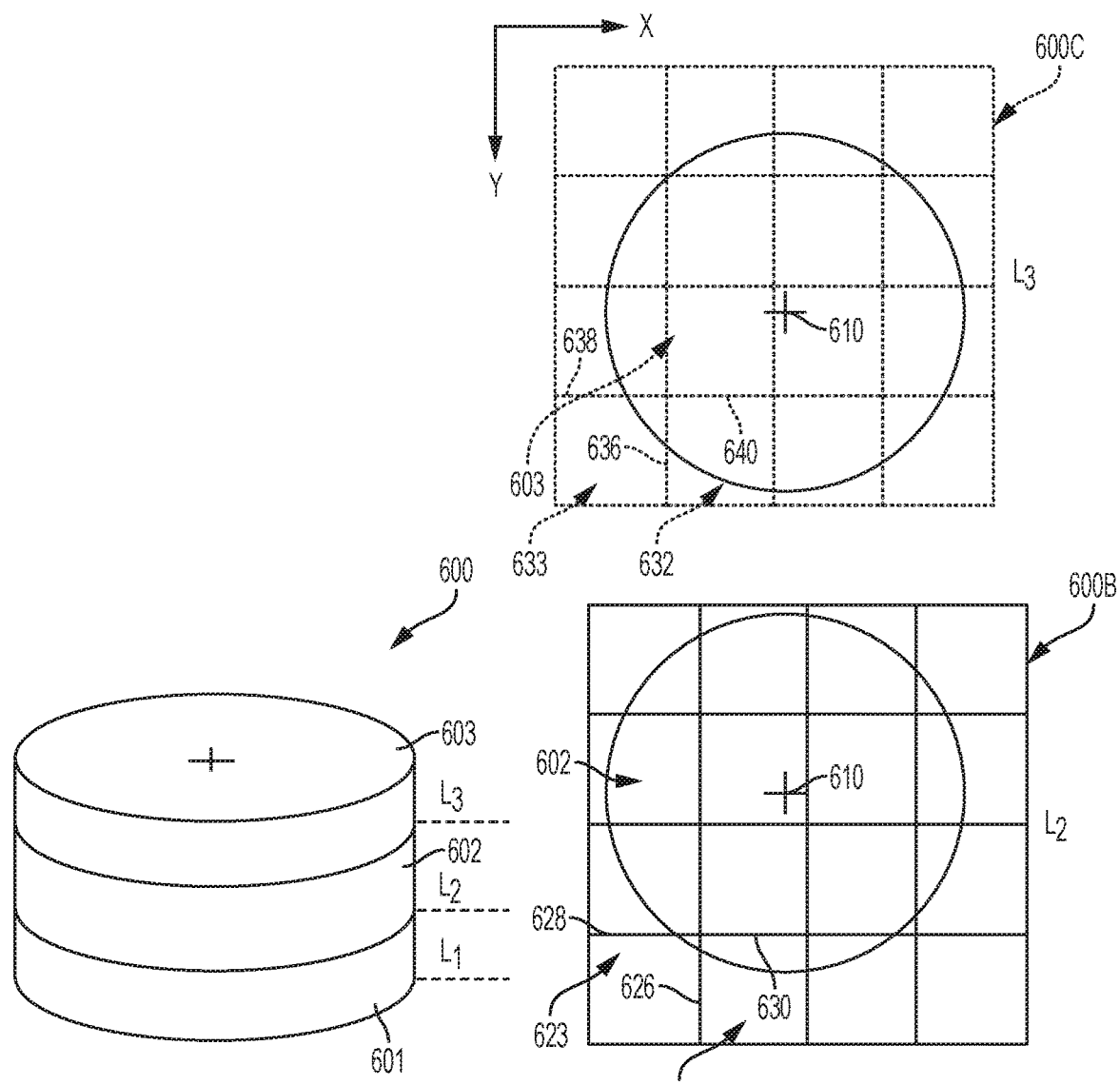
FIG. 10 is a perspective view, depicting example layers of a component built during an AM process in accordance with one aspect of the disclosure.

Once a layer is formed using any one of the abovementioned methods discussed supra, a second layer of build material may be provided over the previously at least partially fused region. In one example, a build unit may be moved in a vertical direction (e.g., positive Z direction) when providing the second layer of build material. In another example, the build platform may be moved in a negative vertical direction when providing the second layer of build material. With reference to FIG. 10, for example, the abovementioned examples disclosed with reference to FIGS. 8 and 9 may be used to form any of the layers L1-L3 in FIG. 10. The layers widths in FIG. 10 have been exaggerated for illustrative purposes. Further, it is to be appreciated that any shape or geometry may be formed using the large scale AM apparatuses shown in FIGS. 8 and 9, thus the shapes shown in the figures are for illustrative purposes only and may be greatly simplified. While only three layers are shown here for simplicity purposes, it is to be noted that an AM build process may include significantly more layers than shown in the examples explained below. In one example, a build unit may be moved in a vertical direction (e.g., Z direction) when providing a first layer of build material, moved again in a vertical direction to form a second layer of build material, and moved in a vertical direction to form a third layer of build material. In another example, the build platform may be moved in a negative vertical direction when providing each layer of build material. As shown in FIG. 10, an example built AM component may include a plurality of layers 601, 602, and 603. One example of the abovementioned strategy of arranging scan regions is shown, for example, a first layer 601 may be divided by software into several scan regions (e.g., 632, 633) which may be adjacent and share a border 636 and/or may be spaced from one another, e.g., as shown in FIGS. 8. and 9. It is noted that the build material within each scan region may be solidified using any known method, which may include the scan and/or stripe strategies discussed above. If the object to be formed 600 is a solid cylindrically shaped object, as shown in FIG. 10, scan region 633 may be partially solidified after which the build platform and/or build unit may be moved to a second location with relation to the AM build and scan region 632 may be subsequently partially solidified. It is noted that the order mentioned is not limiting and may be reversed. Similarly a part of a first scan region may be partially formed after which a second scan region or part of a second scan region may be formed, and then the another part of the first scan region may be formed, for example. The scan regions may be joined using any of the abovementioned methods and/or may simply be formed adjacent one another using any known scan strategy.

Figure 11:
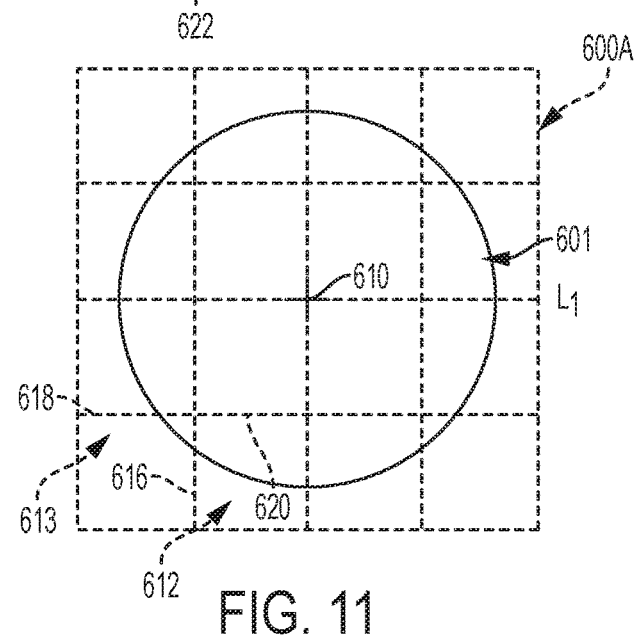
FIG. 11 is a top view depicting example scan zone configurations used to form each layer of the component depicted in FIG. 10.
Figure 12:
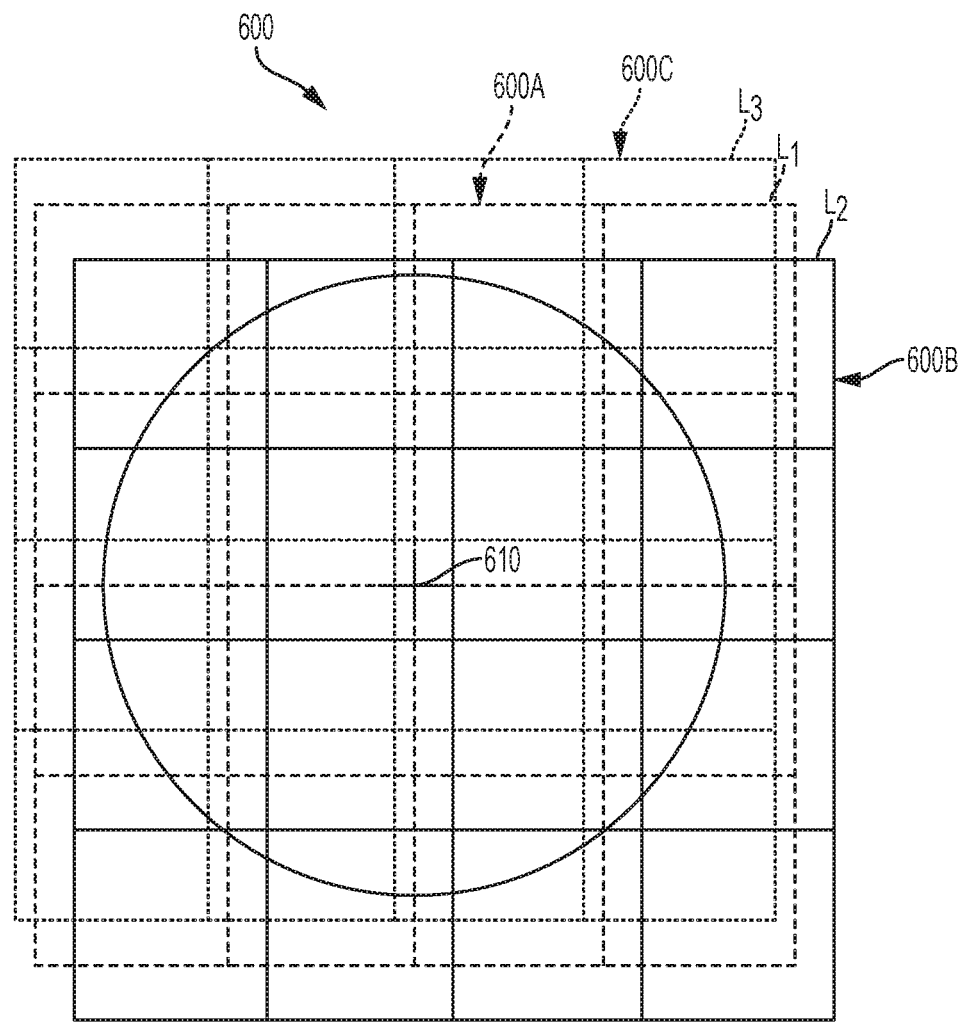
FIG. 12 is a top view depicting the example scan zone configurations used to form each layer of the component depicted in FIGS. 10 and 11.

Using the abovementioned software, the scan region arrangement 600C may be offset with relation to the center of the component 610. A second layer 602 may then be divided up into a series of scan regions 600B. The scan regions in the layer may be offset with relation to the scan regions in the first layer. Further, the scan regions may be offset with relation to the center of the component 610 such that the offset of the first layer does not equal the offset of the second layer. It is noted that while in FIG. 11 each scan region is shown as having a similar geometry, one having ordinary skill in the art would understand that the geometry of each scan region may be varied as well. When using a build unit and/or mobile build platform to build a large scale AM component, it is advantageous to avoid overlap between the borders of scan regions. Thus, it may be desirable to select a first scan region arrangement 600C for the first layer 601 and a second scan region arrangement 600B for the second layer 602 such that portion 628 does not overlap with portion 638. Similarly, it may be advantageous to ensure that portion 626 does not overlap with portion 636 when viewed from the Z direction of FIG. 11 (e.g., as shown in FIG. 12). By introducing variation in the arrangement of the scan regions in each layer, it is possible to improve at least one of: heat distribution in the build, dimensional stability of the completed component; stresses within the completed component, metallurgy of the completed component, efficiency of the build, and/or structural stability during the build.

Similarly, when forming a subsequent third layer 603, the scan region arrangement 600A may be offset with relation to the center of the component 610. A third layer 603 may be divided up into a series of scan regions 600A. The scan regions in the layer may be offset with relation to the scan regions in the first layer and/or second layer. Further, the scan regions may be offset with relation to the center of the component 610 such that the offset of the first layer and/or second layer does not equal the offset of the third layer. As previously mentioned, It is noted that while in FIG. 11 each scan region is shown as having a similar geometry, one having ordinary skill in the art would understand that the geometry of each scan region may be varied as well. When using a build unit and/or mobile build platform to build a large scale AM component, it is advantageous to avoid overlap between the borders of scan regions. Thus, it may be desirable to select a first scan region arrangement 600C for the first layer 601 a second scan region arrangement 600B for the second layer 602, and a third scan region arrangement 600A for the third layer such that portion 618 does not overlap portions 628 and/or 638 in the previous layers. Similarly, it may be advantageous to ensure that portion 616 does not overlap with portions 636 and/or 626 when viewed from the Z direction of FIG. 11 (e.g., as shown in FIG. 12).

FIG. 12 shows a view of the abovementioned scan region arrangements, wherein the scan region arrangement of each of layers L1-L3 are superimposed so as to clarify the offsetting of each scan region arrangement. As shown in FIG. 12, each layer L1, L2, and/or L3 have scan regions that are arranged such that the bordering regions of each scan region do not overlap in a subsequent or previous layer. By introducing variation in the arrangement of the scan regions in each layer as shown in FIG. 12, it is possible to improve at least one of: heat distribution in the build, dimensional stability of the completed component; stresses within the completed component, metallurgy of the completed component, efficiency of the build, and/or structural stability during the build.

Figure 13:
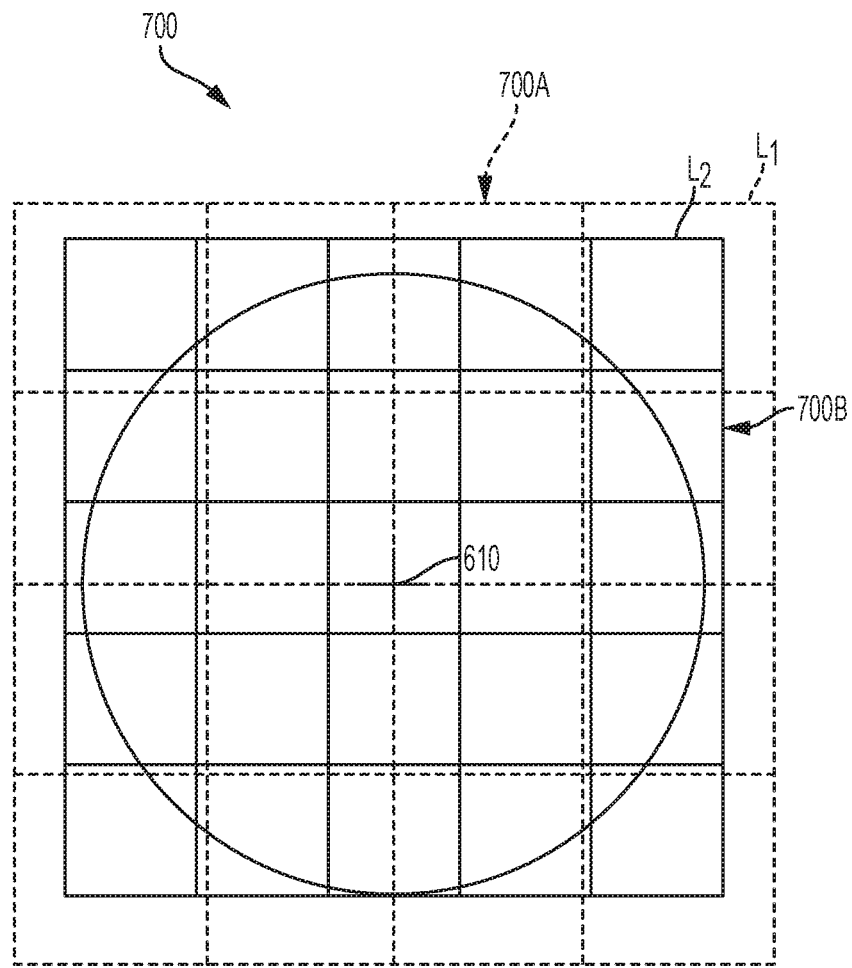
FIG. 13 is a top view depicting an example scan zone configuration used to form each layer of the component in accordance with one aspect of the disclosure.

FIG. 13 shows an alternative scan region arrangement showing scan region arrangements of a layer L1 and L2 superimposed so as to clarify the offset and variation of each scan region arrangement. The alternative scan region arrangement shows an example of scan fields having varying geometries. As shown in FIG. 13, each layer L1 and L2 have scan regions 700A and 700B that vary in geometry and are arranged such the majority of the bordering regions of each scan region do not overlap in a subsequent or previous layer. By introducing variation in the arrangement of the scan regions in each layer as shown in FIG. 13, it is possible to improve at least one of: heat distribution in the build, dimensional stability of the completed component; stresses within the completed component, metallurgy of the completed component, efficiency of the build, and/or structural stability during the build.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

What is claimed is:

1. A method for forming an object comprising:
solidifying at least a portion of a first layer of a build material within a first scan region including a first location of a build unit relative to the build material;
moving the build unit to a second scan region including a second location of the build unit relative to the build material, and solidifying at least a portion of the first layer of the build material within the second scan region;
providing a second layer of the build material over at least a portion of the first scan region; and
solidifying at least a portion of the second layer of the build material within a third scan region including a third location of the build unit relative to the build material, wherein the third scan region at least partially overlaps but is offset with relation to the first scan region;
wherein the build unit comprises an irradiation emission directing device and a laminar gas flow zone.

2. The method for forming the object of claim 1, wherein the third scan region overlaps a border between the first scan region and the second scan region.

3. The method for forming the object of claim 1, wherein the first scan region has a first length along a first direction, and the third scan region has a second length along the first direction, wherein the first and second lengths are not equal.

4. The method for forming the object of claim 1, wherein the first scan region and the second scan region are adjacent.

5. The method for forming the object of claim 1, further comprising:
  solidifying at least a portion of the second layer of the build material within a fourth scan region, wherein the fourth scan region overlaps the second scan region and not the first scan region.

6. The method for forming the object of claim 1, wherein the build unit is moved to solidify at least a portion of the build material within the third scan region.

7. The method for forming the object of claim 1, wherein the build unit is moved in a substantially vertical direction when providing the second layer of the build material.

8. The method for forming the object of claim 1, wherein each solidification step includes sintering, melting, or binder jetting the build material.

9. A non-transitory computer readable medium storing a program configured to cause a computer to execute an additive manufacturing method, the manufacturing method comprising:
  solidifying at least a portion of a first layer of a build material within a first scan region including a first location of a build unit relative to the build material;
  moving the build unit or a build platform to a second scan region including a second location of the build unit relative to the build material, and solidifying at least a portion of the first layer of the build material within the second scan region;
  providing a second layer of the build material over at least a portion of the first scan region; and
  solidifying at least a portion of the second layer of the build material within a third scan region including a third location of the build unit relative to the build material, wherein the third scan region at least partially overlaps but is offset with relation to the first scan region;
  wherein the build unit comprises an irradiation emission directing device and a laminar gas flow zone.

10. The non-transitory computer readable medium storing the program of claim 9, wherein the third scan region overlaps a border between the first scan region and the second scan region.

11. The non-transitory computer readable medium storing the program of claim 9, wherein the first scan region has a first length along a first direction, and the third scan region has a second length along the first direction, wherein the first and second lengths are not equal.

12. The non-transitory computer readable medium storing the program of claim 9, wherein the first scan region and the second scan region are adjacent.

13. The non-transitory computer readable medium storing the program of claim 9, further comprising:
  solidifying at least a portion of the second layer of the build material within a fourth scan region, wherein the fourth scan region overlaps the second scan region and not the first scan region.

14. The non-transitory computer readable medium storing the program of claim 9, wherein the build unit is moved to solidify at least a portion of the build material within the third scan region.

15. The non-transitory computer readable medium storing the program of claim 9, wherein the build platform is moved to solidify at least a portion of the build material within the third scan region.

* * * * *